Patented Aug. 4, 1931

1,817,804

UNITED STATES PATENT OFFICE

PAUL DAMM, OF HINDENBURG, GERMANY, ASSIGNOR TO THE KOPPERS COMPANY, A CORPORATION OF DELAWARE

PROCESS FOR THE PURIFICATION OF BENZENOID HYDROCARBON OILS

No Drawing. Application filed August 30, 1930, Serial No. 479,084, and in Germany July 16, 1926.

My invention relates to the purification or hydrocarbon oils and more particularly benzol or benzene and structurally related hydrocarbons such as toluol, xylol and other oils contained in the mixture of hydrocarbon oils known as "light oil" as removed from fuel gases, such, for example, as coal gas.

These oils as originally recovered from fuel gases or from tars obtained from such gases contain considerable amounts of impurities such, for example, as unsaturated hydrocarbons, which approximate the principal constituents of the oil in volatility and which therefore are exceedingly difficult or practically impossible to remove by distillation alone.

Prior processes for purifying such hydrocarbon oils have employed sulphuric acid for the purpose of treating the oil to be purified.

As is well known, according to such prior practice benzol or light oil or the like is charged into an agitator vessel with concentrated sulphuric acid (66° Baumé) and the mixture is stirred violently. In this manner there is effected a polymerization or other conversion of the undesirable impurities into a form in which they largely separate from the oil and pass into the acid layer.

After agitation, the mixture of oil and acid is allowed to stand until good separation of the oil layer and the acid layer has occurred and the acid layer is then drawn off while the oil remains in the agitator and is subsequently treated for the neutralization of acidic impurities remaining therein.

Neutralization is accomplished in a similar manner, either by first agitating the oil with water and then agitating the oil with a solution of an alkali such, for example, as caustic soda, or by treatment with a solution of an alkali alone. In each case, the agitation operation is followed by a settling period and a separation operation as before.

This method of operation has various disadvantages. The acid layer from the first operation is rich in dissolved matter, consisting in part of reaction products of the strong acid and unsaturated hydrocarbons, so much so in fact that it is of a rather thick consistency and for this reason is known as "acid sludge." The disposal of this material represents a serious problem. Ordinarily, the acid sludge cannot be discarded as such and must be purified to some extent at least from its free acid content. The regeneration of the acid is difficult and costly and requires special apparatus, and the recovered resinous material is of no value.

Furthermore, the formation of "acid sludge" and also the presence of sulphonates and the like in the oil being purified, and later to be removed in the neutralization step, represents a serious loss of material which could be recovered in valuable form.

An object of the present invention is to provide a process for purifying oils of the character indicated above in which the disadvantages of prior processes are overcome.

A second object of my invention is to provide a process for purifying hydrocarbon oils in which the production of an acid sludge is avoided.

A further object of my invention is to provide a process for purifying hydrocarbon oils in which the acid which is not actually consumed in the process may be withdrawn in a form in which it does not require the difficult regeneration of the prior art and in which it is suitable without further treatment for many purposes.

A still further object of my invention is to provide a process in which the impurities removed from the oil are recovered in the form of valuable materials.

My invention has for further objects such other operative advantages or results as may hereinafter be found to appear.

My invention contemplates the provision of a process in which the treatment or conversion of the impurities present in the oil proceeds only to such a point that the bulk of the impurities remains in such form as to be soluble in the oil itself upon being freed from the acid, as for example, in the neutralization step, so that no permanent separation of the bulk of the impurities from the oil occurs.

Nevertheless, said impurities are so polymerized or otherwise modified by the purification treatment as ultimately to subsist in the oil in a form of relatively low volatility with respect to the volatility of the hydrocarbon constituents comprising the bulk of the oil being purified and thus may subsequently be separated from the more volatile constituents of the oil by a simple distillation operation in which they remain after volatilization of the lighter constituents of the oil. In this form the modified impurities possess considerable value.

The oil is initially treated under proper temperature conditions with sulphuric acid which is preferably somewhat diluted, for example, an acid containing less $H_2SO_4$ than the concentrated (66° Baumé) acid employed in prior practice, and preferably at a temperature not exceeding about 50° C. In general, I prefer to employ a sulphuric acid of a strength corresponding to from 60° to 65.5° Baumé, but the actual concentration will depend upon the nature of the material to be purified, and is best determined by experiment.

The oil is agitated with this relatively dilute sulphuric acid in the usual manner.

The mixture of the oil and the acid is then allowed to settle, whereupon three layers are formed, the first consisting of the oil, the second or intermediate layer of the acid resins, and the third layer of the acid. The acid layer is drawn off, leaving the oil and acid resin layers in the treating vessel.

The acid layer separated is substantially free from resinous and other impurities and thus useful for many purposes without further treatment or purification.

Operating in this manner it is found that the bulk of the impurities originally present in the oil is so modified as to be temporarily insoluble in the oil but in such form as to again go into solution in the oil upon subsequent neutralization of the acid.

The other layers, that is, the oil and the acid resin layers, are then neutralized in the usual manner to remove acidic materials remaining after the acid washing by washing with a solution of an alkali, whereupon the resinous materials are freed from acid and re-dissolve in the oil being treated.

After washing with caustic solution and separation of the spent alkali, the oil is then distilled for the volatilization and condensation of its more volatile constituents. In this distillation step, which may be carried out in the usual manner, the modified impurities either remain as residue or may be collected in a heavy fraction, for example, in the form of coumarone resins and like products, and are of considerable value.

The precise amounts of acid, water and alkali to be employed will vary with the composition and the nature of the oil to be purified and the extent of purification desired and may best be determined by experiment with the particular oil to be purified and in accordance with the degree of purification desired. Nevertheless, in order to enable one skilled in the art to fully understand the present invention, some typical examples of my process will now be recited.

The crude light oil produced in one of the large coke-oven plants of this country, when the production of a motor fuel, (as distinguished from the production of "pure products",) is desired, requires agitation for a period of one hour with about 2% by volume of from 62° to 63° Baumé and preferably 62.5° Baumé sulphuric acid followed by separation of the acid and the addition of about 10% by volume of caustic soda solution having a specific gravity of 1.15 and further agitation for a period of 25 minutes. The oil is then separated from the spent alkali as above described and distillation takes place in the usual manner.

When a greater degree of purity and stability in the finished product is desired, as for example, when commercially pure products are desired, there may be employed larger amounts of acid, for example, from 5 to 10% by volume of the oil treated, and higher strengths of acid, for example, from 63° to 65.5° Baumé. That is, the acid may be as strong as can be employed without producing a sludge incapable of being redissolved in the oil.

The temperature conditions under which the acid washing takes place have a considerable influence upon the reactions involved. These reactions are principally exothermic and cause the liberation of considerable amounts of heat during the washing period depending principally upon the strength of acid but also upon the amount of unsaturates and other impurities present in the oil being washed.

In my process, the temperature conditions are of particular importance due to the nature of the process and the results attending the same. For example, it has been found that if, when the ultimate recovery of pure products is contemplated, the crude light oil is washed at ordinary atmospheric temperatures of say 20° to 30° C. or higher, the liberation of heat, due to the action of the 63° to 65.5° Baumé acid employed, may cause the temperature of the oil being treated to rise to about 60° C.

When such temperatures are attained, it is found that some of the treated impurities are not capable of re-solution in the oil. This undesirable effect can be eliminated if the temperature of the reaction is not allowed to go above 50° C. or preferably about 45 to 47° C. Under these conditions this result may ordinarily be effected if the oil being introduced into the mixing vessel 6 for the acid washing treatment is cooled in the vessel 11a to a temperature of, for example, from 5° to 15° C. and preferably about 10° C.

On the other hand, when the manufacture of motor fuel is contemplated and the acid is correspondingly diluted, for example, to from 62° to 63° Baumé or even less, it is ordinarily desirable to accomplish the washing under such temperature conditions that the final temperature of the oil in the washing stage is not less than from 38 to 39° C. or even as high as about 45° C. In order that this may be true, it is ordinarily desirable to bring the oil to be washed in contact with the acid at a temperature of about 30° C. and in cool weather it may often be necessary to heat the oil prior to its introduction.

I am aware that in the prior practice referred to some of the impurities originally present in the oil may remain there in a form capable of being removed from the oil by distillation. This is particularly true of such impurities as coumarone, indene and the like which upon treatment with the acid are polymerized into corresponding resins or resin-like bodies. Nevertheless, in the prior art, a large amount of the impurities originally present in the oil were, by reason of the fact that concentrated acid was employed, so modified by direct reaction with the acid or otherwise that they remained in the acid layer in the form of the sludge hereinabove referred to. According to the process of my invention substantially all of the undesired impurities, although a portion thereof may in the initial stage of the process be temporarily removed from the oil being purified, are, nevertheless, not so strongly modified as to prevent subsequent re-solution thereof in the oil.

I am also aware that it has been proposed to conduct the purification of oils of the character indicated by first washing the oil with relatively dilute acid and then washing the oil with concentrated acid, i. e., acid of 66° Baumé strength. However, according to that method, the fact that the oil is subjected to treatment with the concentrated acid, together with the fact that the acid was not diluted in the presence of the oil, made it impossible to obtain the advantageous results which are obtained according to the present process. In fact, the dehydrating action of the initially added although weaker acid, tended to increase the undesirable action of the subsequently added and stronger acid, by removing any water which might otherwise have slightly diluted the latter and thereby moderated its action.

It will be understood that in the claims hereinafter made, the expression "when freed from the acid" does not necessarily imply that complete neutralization of the acid takes place, as in many instances it is found that complete re-solution of the products of conversion of the original impurities takes place before the aqueous phase actually becomes alkaline or neutral. It will further be understood that the expression "in unobjectionable form" in the claims as relating to the redissolved products of conversion is intended to mean that the products of conversion can be separated from the oil by distillation in the usual manner, as contrasted with the original form of the impurities which makes it impossible to separate the latter in the usual course of distillation.

It will be apparent from the above that my process makes it possible to accomplish the purification of hydrocarbon oils of the character specified in an extremely advantageous manner. Instead of the usual and highly disagreeable acid sludge which has been produced in the past there is recovered an acid of relatively very high purity and the resinous materials are eventually separated from the oil in a valuable and advantageous form.

I claim as my invention:

1. The process of refining a benzenoid hydrocarbon oil which comprises agitating the oil with sulphuric acid of a strength sufficient to cause the conversion of materials originally present in the oil as impurities to products of higher boiling points, but of insufficient strength to prevent the conversion of said impurities to products incapable, when freed from the acid, of being re-dissolved in the hydrocarbon oil, and then freeing the products of conversion from the acid while in contact with the oil in such manner that substantially all of the products of conversion re-dissolve in the oil in unobjectionable form.

2. The process of refining a benzenoid hydrocarbon oil which comprises agitating the oil with sulphuric acid of from 60° to 65.5° Baumé to effect the conversion of materials originally present in the oil as impurities to products of higher boiling points, and then freeing the resultant products of conversion from the acid while in contact with the oil in such manner that substantially all of said products of conversion re-dissolve in the oil in unobjectionable form.

3. The process of refining a benzenoid hydrocarbon oil which comprises agitating the oil with sulphuric acid of from 60° to 65.5° Baumé at a temperature of not more than about 45° C. to effect the conversion of materials originally present in the oil as impurities to products of higher boiling points, and then freeing the resultant products of conversion from the acid while in contact with the oil in such manner that substantially all of said products of conversion re-dissolve in the oil in unobjectionable form.

4. The process of refining a benzenoid hydrocarbon oil which comprises agitating the oil with sulphuric acid of from 60° to 65.5° Baumé at a temperature of from 5° to 30° C. to cause the conversion of materials originally present in the oil as impurities to products of higher boiling points, and then freeing the resultant products of convension from the acid in the presence of the oil by removing a portion of the acid and treating the remaining oil and products of conversion with a neutralizing agent comprising a solution of an alkali, whereby substantially all of said products of conversion re-dissolve in the oil in unobjectionable form.

5. The process of refining a benzenoid hydrocarbon oil prior to distillation thereof for the manufacture of motor fuel therefrom, which comprises agitating the oil with sulphuric acid of from 62° to 63° Baumé to cause the conversion of materials originally present in the oil as impurities to products of higher boiling points, and then freeing the resultant products of conversion from the acid in the presence of the oil in such manner that substantially all of said products of conversion re-dissolve in the oil in unobjectionable form.

6. The process of refining a benzenoid hydrocarbon oil prior to distillation thereof for the manufacture of motor fuel therefrom, which comprises agitating the oil with about 2% by volume of sulphuric acid of approximately 62.5° Baumé to cause the conversion of materials originally present in the oil as impurities to products of higher boiling points, and then freeing the resultant products of conversion from the acid in the presence of the oil in such manner that substantially all of said products of conversion re-dissolve in the oil in unobjectionable form.

7. The process of refining a benzenoid hydrocarbon oil prior to distillation thereof for the manufacture of motor fuel therefrom, which comprises agitating the oil with about 2% by volume of sulphuric acid of from 62° to 63° Baumé at a temperature of about 30° C. to cause the conversion of materials originally present in the oil as impurities to products of higher boiling points, and then freeing the resultant products of conversion from the acid in the presence of the oil by removing a portion of the acid and treating the remaining oil and products of conversion with a neutralizing agent comprising a solution of an alkali, whereby substantially all of said products of conversion re-dissolve in the oil in unobjectionable form.

8. The process of refining a benzenoid hydrocarbon oil prior to distillation thereof for the recovery of the principal constituents of the oil in substantially pure form, which comprises agitating the oil with sulphuric acid of from 63° to 65.5° Baumé to cause the conversion of materials originally present in the oil as impurities to products of higher boiling points, and then freeing the resultant products of conversion from the acid in the presence of the oil in such manner that substantially all of said products of conversion re-dissolve in the oil in unobjectionable form.

9. The process of refining a benzenoid hydrocarbon oil prior to distillation thereof for the recovery of the principal constituents of the oil in substantially pure form, which comprises agitating the oil with from 5 to 10% by volume of sulphuric acid of from 63 to 65.5° Baumé to cause the conversion of materials originally present in the oil as impurities to products of higher boiling points, and then freeing the resultant products of conversion from the acid in the presence of the oil in such manner that substantially all of said products of conversion re-dissolve in the oil in unobjectionable form.

10. The process of refining a benzenoid hydrocarbon oil prior to distillation thereof for the recovery of the principal constituents of the oil in substantially pure form, which comprises agitating the oil with sulphuric acid of from 63 to 65.5° Baumé to cause the conversion of materials originally present in the oil as impurities to products of higher boiling points and then freeing the resultant products of conversion from the acid in the presence of the oil by removing a portion of the acid and treating the remaining oil and products of conversion with a neutralizing agent comprising a solution of an alkali whereby substantially all of said products of conversion re-dissolve in the oil in unobjectionable form.

In testimony whereof, I have hereunto subscribed my name this 15th day of August, 1930.

Dr. PAUL DAMM.